(12) United States Patent
Hitzler et al.

(10) Patent No.: US 11,940,718 B2
(45) Date of Patent: Mar. 26, 2024

(54) OPTICAL ASSEMBLY HAVING A MOVABLE LENS UNIT

(71) Applicant: Leica Microsystems CMS GmbH, Wetzlar (DE)

(72) Inventors: Sebastian Hitzler, Hohenahr-Erda (DE); Christian Schulz, Huettenberg (DE); Martin Kubek, Driedorf (DE); Benjamin Deissler, Butzbach (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/886,487

(22) Filed: Aug. 12, 2022

(65) Prior Publication Data
US 2023/0056633 A1 Feb. 23, 2023

(30) Foreign Application Priority Data

Aug. 19, 2021 (EP) .................................... 21192140

(51) Int. Cl.
*G03B 17/56* (2021.01)
*G03B 17/12* (2021.01)

(52) U.S. Cl.
CPC ........... *G03B 17/565* (2013.01); *G03B 17/12* (2013.01)

(58) Field of Classification Search
CPC ............................. G03B 17/12; G03B 17/565
See application file for complete search history.

(56) References Cited

U.S. PATENT DOCUMENTS

| | | | | |
|---|---|---|---|---|
| 3,675,093 A | * | 7/1972 | Russo | H01G 5/14 361/296 |
| 4,577,944 A | * | 3/1986 | Grosser | G03B 17/10 352/35 |
| 8,730,583 B2 | | 5/2014 | Schek | |
| 2002/0089767 A1 | * | 7/2002 | Bell | F41G 1/38 359/822 |
| 2013/0010367 A1 | * | 1/2013 | Schek | G02B 27/0068 359/656 |
| 2014/0064667 A1 | * | 3/2014 | Isenhour | G02B 6/3873 385/76 |

FOREIGN PATENT DOCUMENTS

| | | | |
|---|---|---|---|
| GB | 1536203 A | | 12/1978 |
| JP | 2006170260 A | * | 6/2006 |
| JP | 2006170260 A | | 6/2006 |

* cited by examiner

*Primary Examiner* — Clayton E. LaBalle
*Assistant Examiner* — Diana Hancock
(74) *Attorney, Agent, or Firm* — Leydig, Voit & Mayer, Ltd.

(57) ABSTRACT

An optical assembly includes a lens unit capable of being moved along an optical axis of the optical assembly. The lens unit includes a lens mount for holding at least one lens. The optical assembly further includes a sleeve for receiving the lens mount. The lens mount is in sliding contact with and movable in relation to the sleeve as the lens unit is moved along the optical axis. The lens mount is formed of or comprises at its outer surface a self-lubricating material, and/or the sleeve is formed of or comprises at its inner surface a self-lubricating material.

13 Claims, 4 Drawing Sheets

OPTICAL ASSEMBLY HAVING A MOVABLE LENS UNIT

CROSS REFERENCE TO RELATED APPLICATIONS

This application claims benefit to European Patent Application No. EP 21192140.8, filed on Aug. 19, 2021, which is hereby incorporated by reference herein.

FIELD

The present inventive concept relates to an optical assembly having a lens unit capable of being moved along an optical axis of the optical assembly. More specifically, the optical assembly of the present inventive concept is used with or is a part of a microscope. The optical assembly may be a microscope objective or a zoom system or at least a part thereof.

BACKGROUND

An example of an optical assembly as described above is disclosed in U.S. Pat. No. 8,730,583 B2. Described therein is a microscope objective containing a lens system including a lens unit capable of being moved along the optical axis of the lens system to compensate for the thickness of the coverslip used for examining a sample, and further having a lens unit moving mechanism including a drive unit coupled to the lens unit and configured for motorized movement of the lens unit.

In light microscopy, the sample to be examined is often located on a slide and covered by a coverslip of a thin, flat and transparent material. For imaging purposes, an immersion medium is preferably applied to the coverslip, and an immersion objective is used, the front lens of which being immersed in the immersion medium during examination of the sample. This provides a high numerical aperture and thus a high resolution. Imaging of the sample by the microscope objective is affected by many parameters such as thickness and fluctuations in fabrication of the coverslip, kind, temperature and composition of the immersion medium, and the temperature of the elements arranged in the imaging beam path, in other words, by any parameters influencing the refractive index. High-quality microscope objectives have been frequently used having a lens unit which can be moved along the optical axis of the objective in order to compensate for any optical aberrations induced by variations of the refractive index by the aforementioned parameters. The movement of the lens unit can typically be adjusted in the range of a few µm.

Owing to the compact design of microscope objectives, movable lens units are typically implemented in the form of a "sleeve-mount" guide. In order to keep the misalignment or tilting of the optics as low as possible, the mount with lens(es), typically of cylinder shape, is fitted with the "mount sleeve" (sleeve). This means, that the diameter of each sleeve is precisely measured and the sleeve is turned/lathed to fit the mount with a defined clearance. The z-positioning of the mount is realised e.g. by means of a drive mechanism, which is implemented via a screw drive or similar. The mount as well as the sleeve are usually made of brass, which can easily be machined to the necessary tolerances.

Brass, bronze, steel and ceramic can generally be used for the mechanical components of a microscope objective. The normal condition is that the mount and the mount sleeve are both made of brass. With a manual adjustment of the correction lens unit, where only a few adjustments are made, normal function is guaranteed. Due to increased demand for automation and motorized adjustment, however, the number of adjustments (strokes) has increased considerably. As a result, the mount works its way into in the sleeve and blocks after a certain number of strokes. Even a combination of the above-mentioned materials does not help to remedy this phenomenon.

While a certain example of an optical assembly has been discussed above, other examples can be envisaged where a lens unit is slidably moved along the optical axis of an optical assembly, such as a zoom system having lens units movable along the optical axis of the zoom system.

SUMMARY

Embodiments of the present invention provide an optical assembly. The optical assembly includes a lens unit capable of being moved along an optical axis of the optical assembly. The lens unit includes a lens mount for holding at least one lens. The optical assembly further includes a sleeve for receiving the lens mount. The lens mount is in sliding contact with and movable in relation to the sleeve as the lens unit is moved along the optical axis. The lens mount is formed of or comprises at its outer surface a self-lubricating material, and/or the sleeve is formed of or comprises at its inner surface a self-lubricating material.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
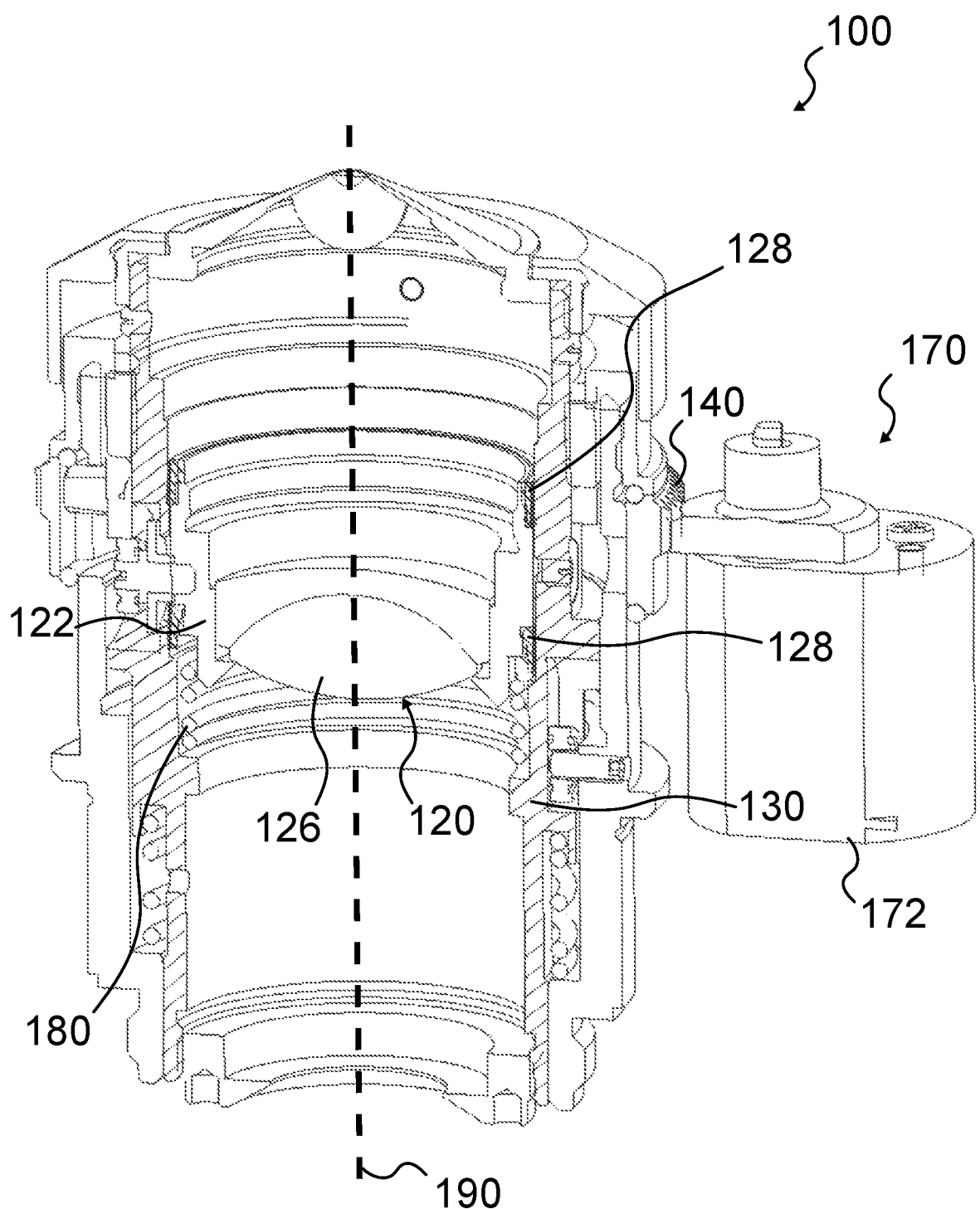
FIG. 1 schematically shows an optical assembly having a motorized adjustment of the lens unit according to some embodiments.

Embodiments of the present invention provide a suitable material or material pairing of components of an optical assembly, which allows a highly wear-resistant operation of the optical assembly. More particularly, a lifetime function, also under temperature fluctuations that occur e.g. when using the optical assembly in an optionally incubated environment, can be afforded.

Embodiments of the present invention provide an optical assembly. The optical assembly includes a lens unit which is capable of being moved along an optical axis of the optical assembly. The lens unit itself comprises a lens mount for holding at least one lens, said lens mount being in sliding contact with and being movable in relation to a sleeve when the lens unit is moved along the optical axis, said sleeve receiving the lens mount. The lens mount is formed of or comprises at its outer surface a self-lubricating material and/or the sleeve is formed of or comprises at its inner surface a self-lubricating material. It should be noted that the lens mount may be a multi-part component.

While self-lubricating materials as such are known and often used in technology, they have not been used so far for components of an optical assembly as described above. Using materials having self-lubricating properties due to oil impregnation involve the risk of oil running onto the optics and thus impairing the optical performance of the optical components. On the other hand, self-lubricating polymer materials often lack mechanical stability and have a relatively high coefficient of thermal expansion leading to the risk of mechanical deformation at temperature fluctuations. However, despite these anticipated disadvantages, the inventors of the present inventive concept found that self-lubricating materials can be used for optical assemblies of the kind described above within the specifications detailed in the present application.

Examples of self-lubrication materials especially suitable for being used in the lens mount and/or sleeve of an optical assembly according to the present inventive concept can be divided into two groups: First, self-lubricating sintered metals like sintered bronze. The material is generated by a powder metallurgy technique and forms a metal matrix being oil-impregnated or containing solid lubricants like molybdenum disulfide or graphite. Sintered bronze is a material having nearly the same thermal expansion coefficient as brass, brass being a material generally used for mechanical components of the optical assembly. The second group of self-lubricating materials is based on polymer materials that have a low coefficient of friction and a high abrasion resistance. Self-lubricating polymer materials are available either as a solid material or a coating. Suitable materials are or comprise polytetrafluoroethylene (PTFE), polyether ether ketone (PEEK), and/or one of these or another base polymer including solid lubricants. An example of the latter composition is commercially available under the name of IGLIDUR which comprises a base polymer, fibers, fillers and solid lubricants. The composition of these components can individually be optimized for the specific application for an optical assembly according to the present inventive concept. IGLIDUR has the same sliding properties as PTFE, but has a higher abrasion resistance. Coatings of such self-lubricating polymer compositions can be applied using corona powder coating processes resulting in a coating of a thickness of up to 250 µm.

In the following, preferred embodiments of the present inventive concept are described using self-lubricating materials of the two groups described above without limiting the scope of the present invention which is defined by the appended claims. It is noted that the material used should have its self-lubricating properties throughout its entire volume.

In an embodiment, the lens mount comprises a coating formed of or including the self-lubricating material on its outer surface. Alternatively or additionally, the sleeve comprises a coating formed of or including the self-lubricating material on its inner surface. The coating can either consist of the self-lubricating material or include another material apart from the self-lubricating material. Such additional materials can be used to improve the sliding properties and/or the abrasion resistance and/or the thermal stability of the coating. The self-lubricating materials of the above second group of self-lubricating polymer compositions are best suited for such coatings. The mount and/or the sleeve itself is preferably made of a non-self-lubricating material.

In this embodiment, it is preferred if the coating is formed in the form of one or more circumferential rings and/or in the form of coated areas and/or in the form of two or more coated areas along a circumferential direction. The coating may be applied on the outer surface of the lens mount, typically on the outer cylinder surface, and/or on the inner surface of the sleeve, typically also a cylinder surface. Coatings in the form of one or more circumferential rings provide the advantage of maintaining high stability of the lens mount and the sleeve, respectively. The lens mount itself and the sleeve, respectively, is preferably made of brass. The circumferential coating can be interrupted in order to achieve two, three or more coated areas along the circumferential direction. This embodiment has the advantage of the least possible change in shape of the coating due to thermal expansion. Such coated areas may also be otherwise arranged on the surface of the lens mount and/or the sleeve with a view to high mechanical stability and little mechanical deformation due to temperature fluctuations. Particularly preferred is a three-point support, particularly on two different levels each being formed by three coated areas (equally) distributed in the circumferential direction.

Further, in this embodiment, a thickness of the coating is preferably in the range of greater than 0 and less than 250 µm, preferably about 50 to 150 µm, or about 65 to 75 µm. In the example of a microscope objective as an optical assembly having an optical correction lens unit, a fit clearance should be ensured which is typically around 0.007 mm. With the above thickness values of some µm, the thermal expansion only affects the sub-µm range which is much smaller than the fit tolerance of about 7 µm.

In another embodiment, the lens mount comprises one or more rings mounted onto the outer surface of the lens mount, and/or the sleeve comprises one or more rings mounted onto the inner surface of the sleeve, said one or more rings consisting of or comprising the self-lubricating material. In this embodiment, it is preferred to use self-lubricating materials of the first group of materials mentioned above, particularly oil-impregnated sintered bronze. Rings of sintered bronze can be manufactured beforehand and then applied to the lens mount and/or the sleeve of a non-self-lubricating material such as steel or brass. One or more rings of solid material with a preferred thickness of less than 1 mm may be glued to a base body of e.g. brass, resulting in the necessary stability. At room temperature, this embodiment remains very stable and no wear occurs even after more than 100,000 strokes. On the other hand, also one or more such rings consisting of or comprising a self-lubricating polymer composition are conceivable, particularly if both the lens mount and the sleeve comprise such rings.

Another advantage of this embodiment is that the optics held by the lens mount, which is made of a non-self-lubricating material, cannot come into contact with the surrounding one or more rings made of self-lubricating material like sintered bronze. This drastically reduces the risk of oil running onto the optics. Instead of two or more rings, one single ring can be used, which particularly extends over the entire length of the lens mount (and/or, in a less preferred embodiment, over the entire length of the sleeve). However, reducing the sliding surface also reduces the frictional resistance and a smaller ring is also easier to manufacture. Turning two short guide diameters precisely is easier than turning one cylindrical surface over the entire length of the mount. Rings consisting of or comprising the self-lubricating material can be designed to fit different mounts. Thus, it is possible to use this ring geometry for different optical correction lens units in a microscope objective.

A preferred thickness of a ring consisting of or comprising the self-lubricating material is in the range of greater than 0 and less than 1.5 mm, more preferred up to 1 mm or about 1 mm in a radial direction. A thicker ring may be mounted/glued onto the base material and then turned off/milled off to the desired thickness.

Another embodiment is to make the lens mount from a non-self-lubricating material such as brass or steel, and to make the sleeve from a self-lubricating sintered metal such as sintered bronze. The advantage of this embodiment is that the material pairing of brass/stainless steel and sintered bronze is beneficial also for the spring-loaded front assembly which is often used to protect the specimen from collision damage. It should be mentioned that the sleeve not only has guiding or sliding surfaces in the inner diameter, but also in the outer diameter for the movable assembly to prevent collision damage to the specimen. From this point of view, this embodiment uses sintered bronze for all sliding surfaces.

In yet another embodiment, the lens mount and the sleeve are both formed of a self-lubricating polymer composition. In principle, it would be possible to form either the lens mount or the sleeve out of a self-lubricating polymer composition. However, this embodiment only works at constant temperatures. The coefficient of thermal expansion e.g. of IGLIDUR is approximately four times higher than that of steel. A microscope objective can be used in environments with temperatures differing by up to 20° C. which in combination with the required fitting clearance inevitably leads to jamming due to the different expansion of the materials. The embodiment, however, designed with the lens mount and the sleeve both formed of a self-lubricating polymer composition like IGLIDUR would solve the problem of thermal expansion and the associated jamming.

In an embodiment, the optical assembly further comprises a lens unit moving mechanism configured to be operated to transmit force to the lens unit in order to move the lens unit in the direction of the optical axis. Generally, the lens unit moving mechanism can generate a rotational movement induced by manual operation or by an electric motor, for which rotational movement is converted into a linear movement along the optical axis. To this end, the lens unit moving mechanism preferably comprises a handling unit configured for a manually operated movement of the lens unit or an electrical drive unit configured for a motorized movement of the lens unit. The handling unit of this embodiment may comprise a knurled ring which is manually operated and converts a manual rotational movement of the ring into a linear movement of the lens unit along the optical axis. On the other hand, the electrical drive unit of this embodiment may comprise an electric motor for rotationally moving a toothing of the motor, whereby this toothing meshes with a corresponding ring gear of the microscope objective, which also converts a rotational movement into a linear movement of the lens unit along the optical axis. For converting the rotational movement into a linear movement, a cam ring having a cam face extending partially parallel to the optical axis and having a slight slope in relation to a direction perpendicular to the optical axis can be used. A rolling element mounted to the lens mount engages the cam face. An embodiment of such a lens unit moving mechanism is described in U.S. Pat. No. 8,730,583 B2, reference is been made to this publication regarding design and function of a lens unit moving mechanism comprising an electrical drive unit.

In order to press the rolling element mounted to the lens mount against the cam face, the lens mount is acted upon by a spring. In a preferred embodiment, the lens unit moving mechanism comprises a spring or, more generally, a spring member arranged between the lens mount and the sleeve such that, in an axial direction, the spring member at the first end is supported by the lens mount and at a second end is supported by the sleeve. The term "arranged between the lens mount and the sleeve" means that at least a part of the lens mount, on the one hand, and at least a part of the sleeve, on the other hand, surround a corresponding part of the spring member. In other words, the spring member is arranged between parts of the lens mount and the sleeve. At the same time, the lens mount supports a first end of the spring member and the sleeve supports the other second end of the spring member. An example of this embodiment is shown in the figures below.

It should be noted that the above features of the embodiments of the inventive concept can—wholly or in part—be combined to achieve other embodiments still falling under the scope of the present inventive concept as defined in the appended claims.

As used herein, the term "and/or" includes any and all combinations of one or more of the associated listed items and may be abbreviated as "/".

Although some aspects have been described in the context of an apparatus or device, it is clear that these aspects also represent a description of a method of operating such an apparatus or device.

Further embodiments and advantages of the present inventive concept are described below in connection with the following figures.

The following figures are described comprehensively, same reference signs denoting same or similar or at least functionally same elements.

FIG. 1 schematically shows an embodiment of an optical assembly according to the present inventive concept in a longitudinal cross section and in perspective view. In this embodiment, the optical assembly 100 is a microscope objective having a lens unit 120 for correction of optical aberrations due to variations of the refractive index of elements along the imaging beam path, such as differences in the thickness or fluctuations in fabrication of a coverslip covering a sample to be examined, and/or variations in temperature and composition of an immersion medium applied between the front lens of the microscope objective and the sample/coverslip. The respective compensations are achieved by movements of the lens unit 120 along the optical axis 190 of the optical assembly 100 typically in the range of a few μm. Only elements of the objective relevant for the present invention are shown and discussed herein.

The lens unit 120 as shown in FIG. 1 comprises at least one lens 126 which is held by lens mount 122. The lens mount 122 which is made of a non-self-lubricating material like brass comprises two rings 128 made of a self-lubricating material and mounted circumferentially onto the outer surface of the lens mount 122, in this embodiment, one ring 128 at the upper end and one ring 128 at the lower end of the lens mount 122. In this embodiment, rings 128 of oil-impregnated sintered bronze are used. The rings 128 are prefabricated and mounted on the lens mount 122 by gluing. The rings 128 are then turned off/milled off to a thickness of about 1 mm in the radial direction.

The lens unit 120 is movable in a direction parallel to the optical axis 190. Lens unit 120 is received by the sleeve 130 as can be seen in FIG. 1. In this embodiment the material of the sleeve is a non-self-lubricating material such as brass or steel. The resulting material pairing allows a highly wear-resistant operation, also under temperature fluctuations of typically 20° C. At the same time, the preferred fit tolerance of about 7 μm can be maintained. Any risk of tilting or blocking of the lens unit 120 is removed.

The optical assembly 110 according to the embodiment shown in FIG. 1 further comprises a lens unit moving mechanism 170 configured to be operated to transmit force to the lens unit 120 in order to move the lens unit 120 in the direction of the optical axis 190. The lens unit moving mechanism 170 comprises an electrical drive unit 172 comprising a pinion or toothing which meshes with a corresponding ring gear 140 of the microscope objective 100. The ring gear 140 is rotated around the optical axis 190 and its rotational movement is converted into a linear movement of the lens unit 120, e.g. by a mechanism described in U.S. Pat. No. 8,730,583 B2. For converting the rotational movement into a linear movement, a cam ring having a cam face (not shown in FIG. 1) can be used. The cam face is inclined relative to the horizontal. The lens mount 122 engaging the cam face is thus moved in the direction of the optical axis. In order to engage the cam face, the lens mount is acted upon by a spring member 180. As can be seen from FIG. 1, the spring member 180, at its one side, is supported by a protrusion of the sleeve 130 and, at its other side, bears on a corresponding protrusion of the lens mount 122. Thus, seen in a radial direction, the spring member 180 is arranged between the lens mount 122 and the sleeve 130 such that any risk of tilting of the lens mount 122 exceeding the fit tolerance of about 7 μm is avoided.

Figure 2:
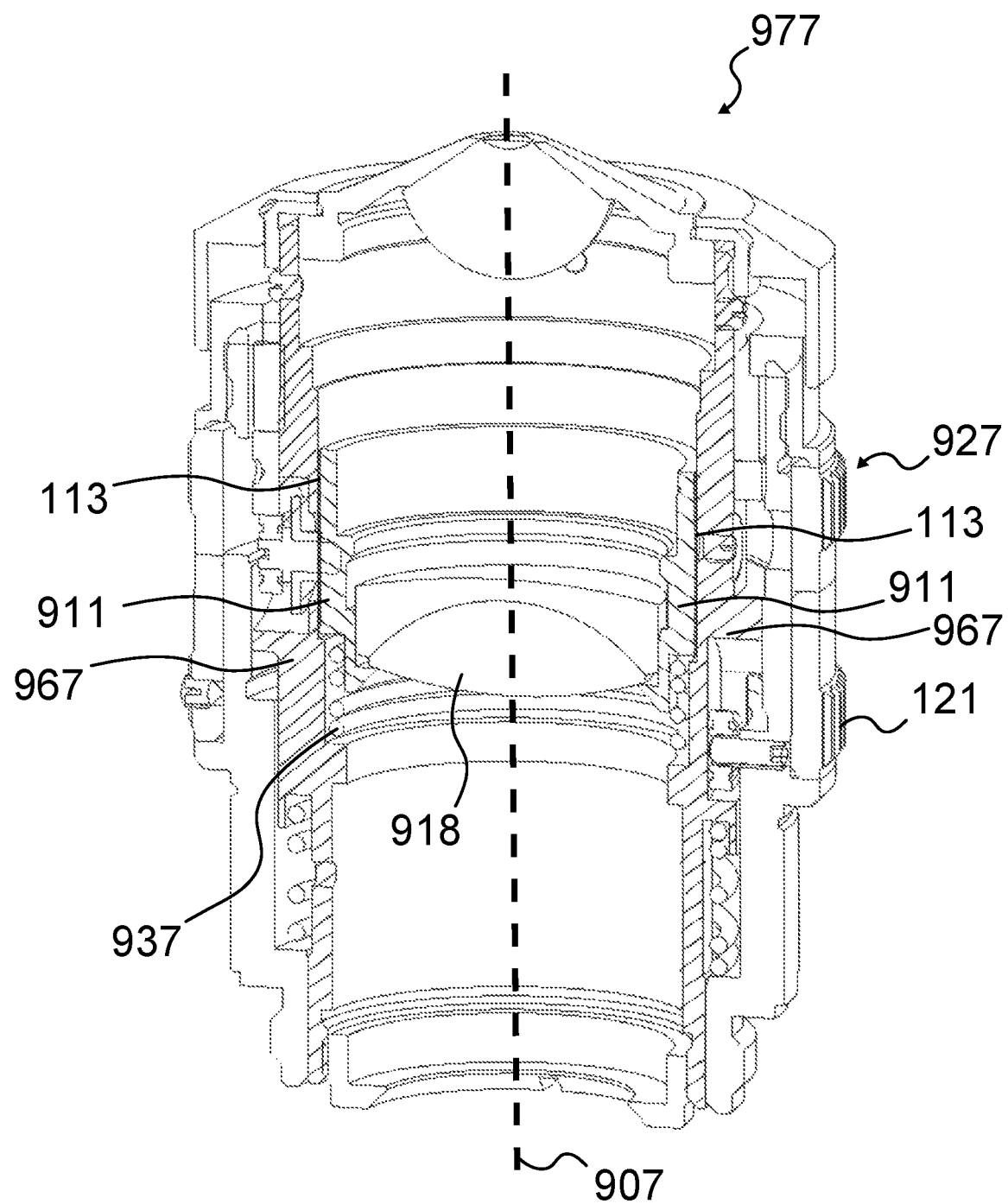
FIG. 2 schematically shows an optical assembly with a manually operated adjustment of the lens unit according to some embodiments.

FIG. 2 schematically shows another embodiment of an optical assembly 100 in a perspective view in a longitudinal cross section. The optical assembly 100 of FIG. 2 essentially corresponds to the one of FIG. 1 with two distinguishing features: First, the lens mount 122 has a coating 228 of a self-lubricating material on its outer cylindrical surface. Second, the lens unit moving mechanism 170 comprises a handling unit 272 to be operated manually for movement of the lens unit 120 in a direction parallel to the optical axis 190.

As can be seen from FIG. 2, lens unit 120 at its outer cylindrical surface facing the inner surface of sleeve 130 has a coating 228 of a self-lubricating material. The coating 228 is in the form of one circumferential ring essentially extending over the entire axial length of the lens mount 122 such that the coating 228 is in sliding contact with the inner surface of sleeve 130. In this embodiment, the coating 228 is of IGLIDUR, a self-lubricating polymer composition essentially comprising one or more base polymers like PTFE or PEEK including fibers, fillers and solid lubricants. Such a composition can be specially designed for the application of linear short strokes. To manufacture the lens mount 122, first, the mount is manufactured from brass with an undersize. The coating is applied onto the lens mount 122 using a corona coating process. In this process, the polymer composition in powder form is charged to 45,000 volts. The mount itself is earthed. The powder spreads evenly over the entire surface until it reaches a saturation point. In this state, the lens mount 122 is heated up to 180° C. After this coating to a thickness of approximately 150 μm, the mount is turned and the optics are glued in place. When centering the edge, the coating is turned off by about 80 μm. What remains is a 70 μm thick layer of self-lubricating polymer material. With such a coating thickness, the thermal expansion/shrinkage is in the sub-μm range, a range which is easily compensated for by the fit tolerance of 7 μm.

As can be further seen from FIG. 2, the lens unit moving mechanism 170 comprises a handling unit 272 comprising a knurled ring which is manually operated and converts a manual rotational movement of the ring in a known manner into a linear movement of the lens unit 120 along the optical axis 190.

Figure 3:
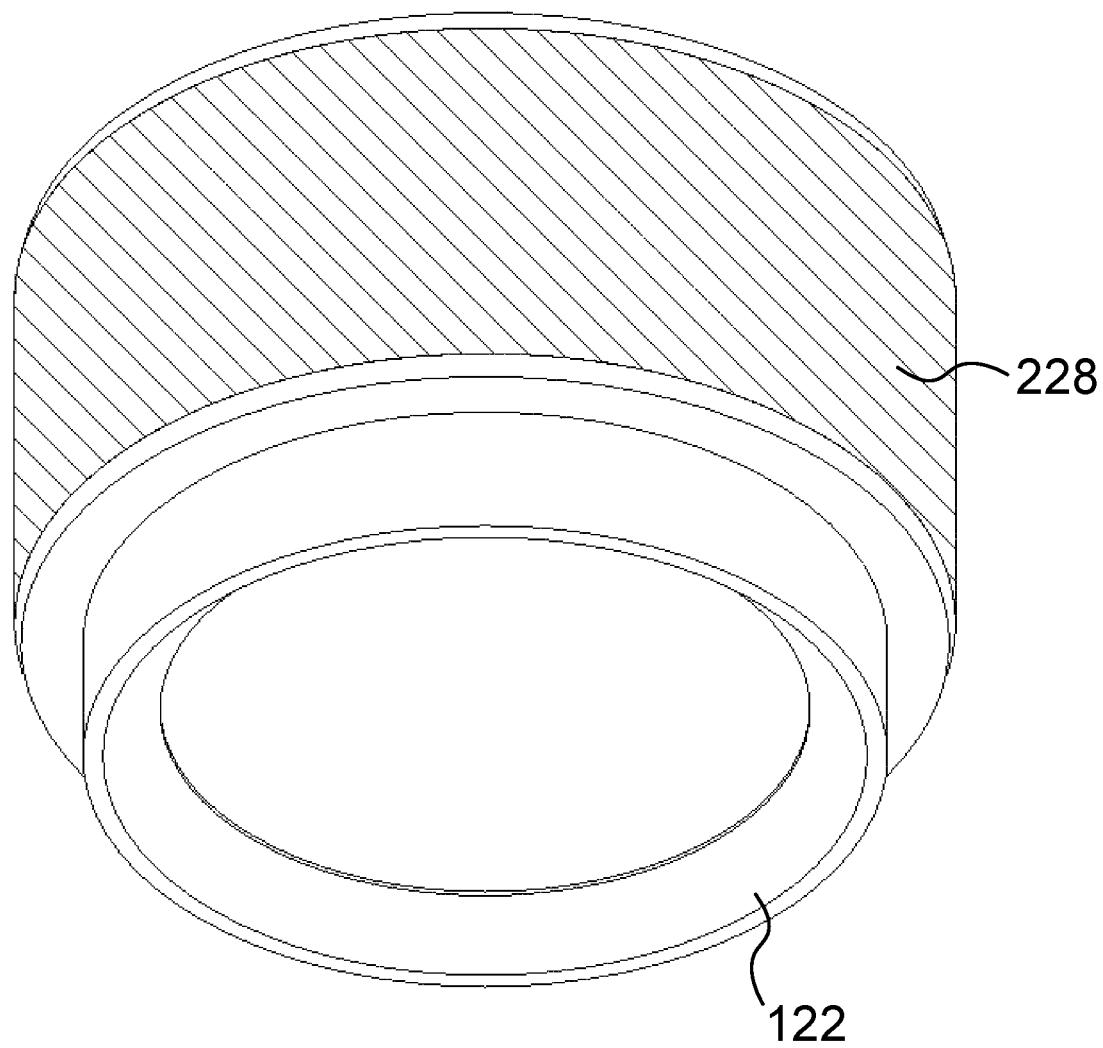
FIG. 3 schematically shows a lens mount of a lens unit of an optical assembly according to some embodiments, the lens mount having a coating of a self-lubricating material.

FIG. 3 schematically shows a lens mount 122 as it can be used for the optical assembly 100 of FIG. 2. The lens mount 122 has on its outer cylindrical surface which moves along the inner surface of the sleeve 130 (see FIG. 2) a coating 228 of a self-lubricating material such as that explained in connection with FIG. 2.

Figure 4:
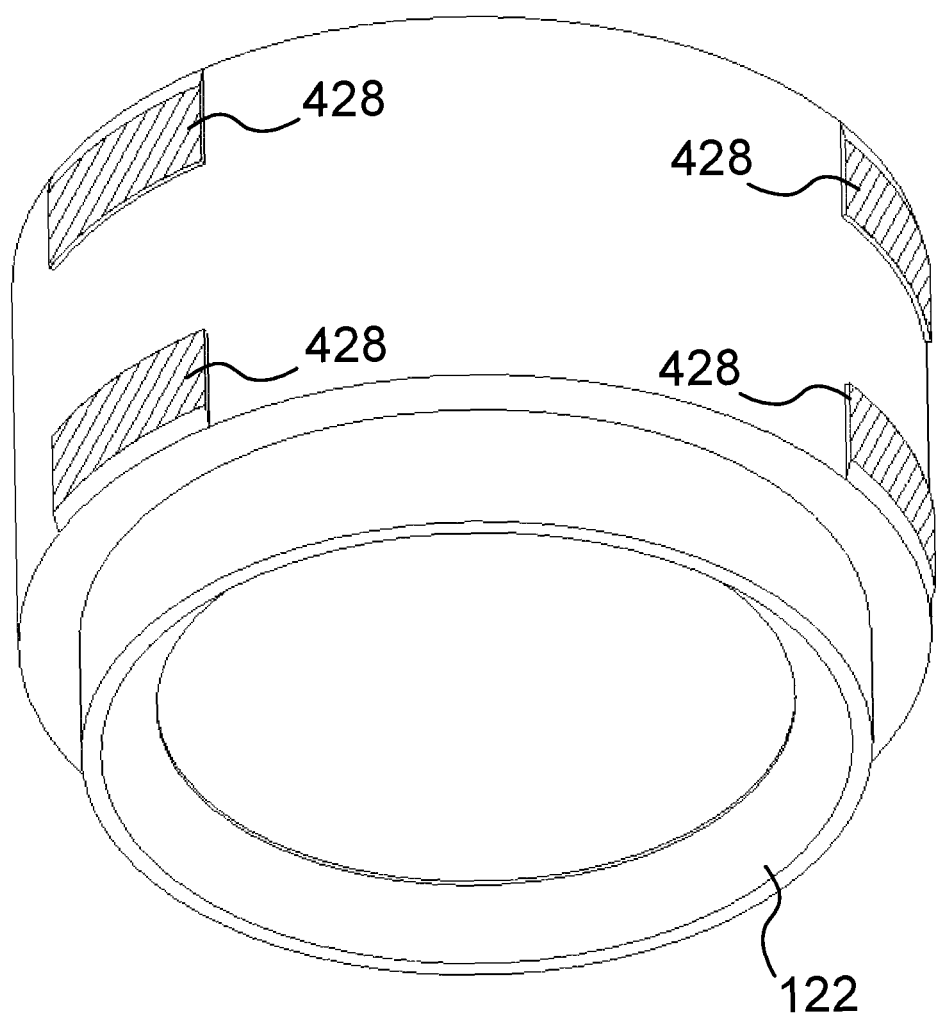
FIG. 4 shows a lens mount similar to that of FIG. 3 with coated areas on its outer surface, according to some embodiments.

FIG. 4 shows another embodiment of a lens mount 122 having coated areas 428 along a circumferential direction at two different horizontal levels on the outer surface of the lens mount, which comes into contact with the inner surface of the sleeve 130. It is preferred to have three equally distributed coated areas 428 at each level. This provides maximum mechanical stability and, at the same time, results in a minimum shape change due to thermal expansion/shrinkage. Thus, the lens mount 122 as shown in FIG. 4 may be used instead of the lens mount shown in FIG. 3 for an optical assembly 100 as shown in FIG. 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 optical assembly
120 lens unit
122 lens mount
126 lens
128 ring
130 sleeve
140 ring gear
170 lens unit moving mechanism 172 electrical drive unit
180 spring member
190 optical axis
228 coating
272 handling unit
428 coating area

The invention claimed is:

1. An optical assembly comprising:
a lens unit capable of being moved along an optical axis of the optical assembly, the lens unit comprising a lens mount for holding at least one lens,
a sleeve for receiving the lens mount, the lens mount being in sliding contact with and movable in relation to the sleeve as the lens unit is moved along the optical axis, wherein
wherein the lens mount comprises one or more rings fixedly mounted onto the outer surface of the lens mount, or the sleeve comprises one or more rings fixedly mounted onto the inner surface of the sleeve, wherein the one or more rings comprises a self-lubricating material.

2. The optical assembly according to claim 1, wherein the lens mount is formed of or comprises the self-lubricating material on its outer surface, or the sleeve if formed of or comprises the self-lubricating material on its inner surface.

3. The optical assembly according to claim 1, wherein the lens mount is formed of or comprises, at the outer surface of the lens mount, the self-lubricating material, and the sleeve is formed of or comprises, at the inner surface of the sleeve the self-lubricating material.

4. The optical assembly according to claim 1, wherein the self-lubricating material is or comprises a self-lubricating sintered metal.

5. The optical assembly according to claim 4, wherein the sintered metal is or comprises sintered bronze.

6. The optical assembly according to claim 1, wherein the self-lubricating material is or comprises a self-lubricating polymer composition.

7. The optical assembly according to claim 6, wherein the polymer composition is or comprises at least one of:
polytetrafluoroethylene,
polyether ether ketone,
polytetrafluoroethylene including solid lubricants,
polyether ether ketone including solid lubricants, or
another base polymer including solid lubricants.

8. The optical assembly according to claim 6, wherein the lens mount and the sleeve are formed of a self-lubricating polymer composition.

9. The optical assembly according to claim 1, wherein the optical assembly is a microscope objective.

10. The optical assembly according to claim 9, wherein the movable lens unit is configured as an optical compensating element compensating optical aberrations.

11. The optical assembly according to claim 1, further comprising a lens unit moving mechanism configured to be operated to transmit force to the lens unit in order to move the lens unit in the direction of the optical axis.

12. The optical assembly according to claim 11, wherein the lens unit moving mechanism comprises a spring member arranged between at least parts of the lens mount and the sleeve such that, in an axial direction, the spring member at a first end is supported by the lens mount and at a second end is supported by the sleeve.

13. The optical assembly according to claim 11, wherein the lens unit moving mechanism comprises a handling unit configured for a manually operated movement or an electrical drive unit configured for a motorized movement of the lens unit.

* * * * *